July 5, 1932.  W. J. VERITY  1,865,598

REAR WHEEL CONSTRUCTION FOR PLOWS

Filed Jan. 14, 1931  2 Sheets-Sheet 1

INVENTOR:
WILLIAM J. VERITY

BY  ATTORNEYS

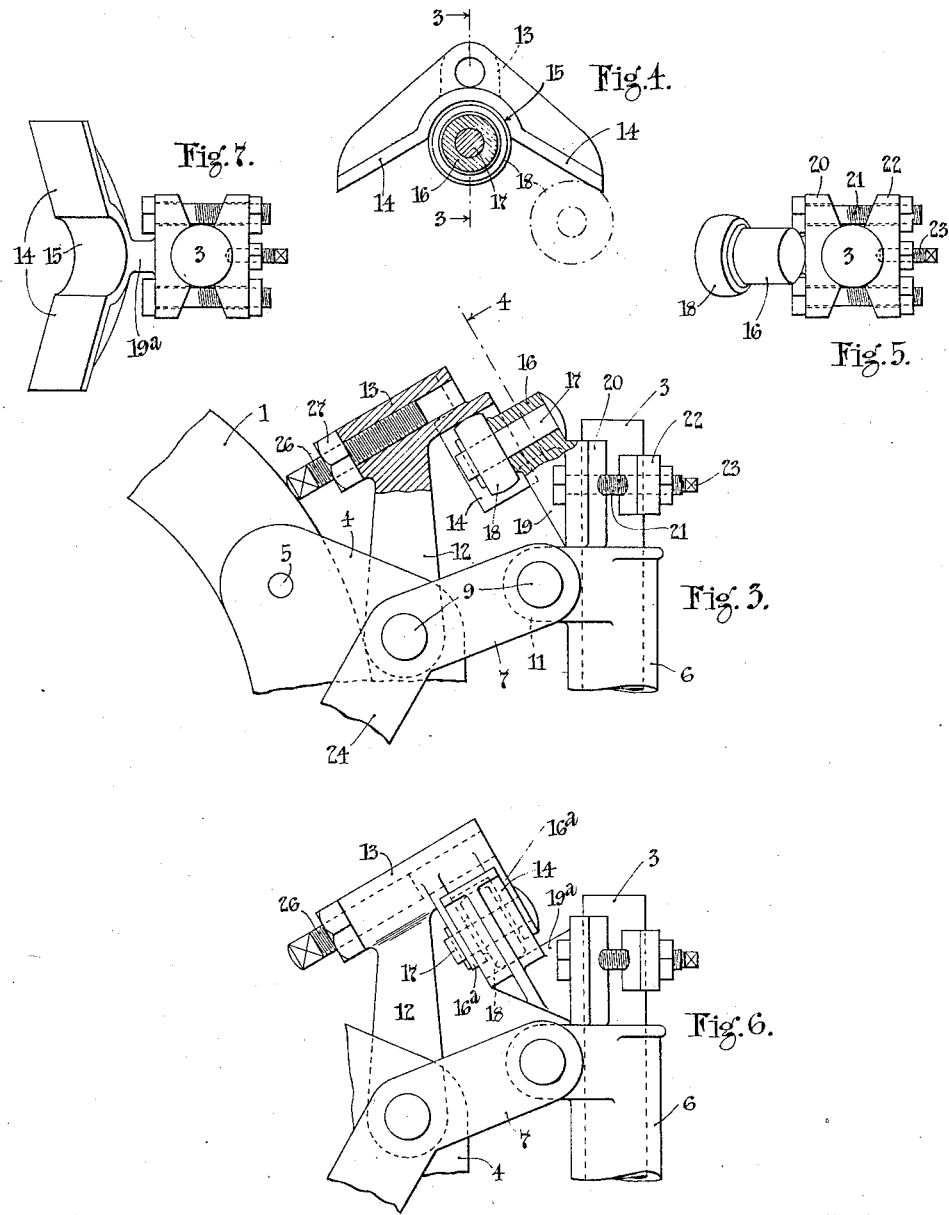

Patented July 5, 1932

1,865,598

UNITED STATES PATENT OFFICE

WILLIAM J. VERITY, OF BRANTFORD, ONTARIO, CANADA, ASSIGNOR TO MASSEY-HARRIS COMPANY, LIMITED, OF TORONTO, ONTARIO, CANADA

REAR WHEEL CONSTRUCTION FOR PLOWS

Application filed January 14, 1931. Serial No. 508,758.

This invention relates to plows of the type having a trailing rear wheel for engaging the bank of the furrow.

It is customary to provide a locking dog to engage a notch in the bearing or supporting member of the rear axle to hold the rear wheel in the desired operative position. The known arrangements are open to certain disadvantages, notably because they are not sufficiently automatic and positive in operation. When the plow is lowered it is only by chance if the locking dog enters the notch immediately. Usually the plow must travel a considerable distance before the rear wheel, in swinging from side to side, causes the notch to move into position to receive the dog. Thereafter the wheel is positively locked to the plow and any obstruction which deflects the rear wheel sideways causes a lateral movement of the plow. If the obstruction causes disengagement of the dog as well as deflection of the wheel, it may be some time before the the dog again enters the notch, and in the meantime the rear wheel is ineffective.

The present invention has for object to provide a rear wheel construction from which the above mentioned objections are eliminated. Under normal plowing conditions the invention holds the rear wheel in the desired position and means are provided whereby, when the plow is in lowered position, the wheel has a constant tendency to remain in or return to operative position.

Other objects of the invention are to provide means for readily adjusting the gather or the suction of the plow.

The invention consists in the construction, combination and arrangement of parts hereinafter described and more particularly pointed out in the appended claims.

Referring now to the accompanying drawings, which illustrate, by way of example, two convenient embodiments of the invention—

Figure 1:
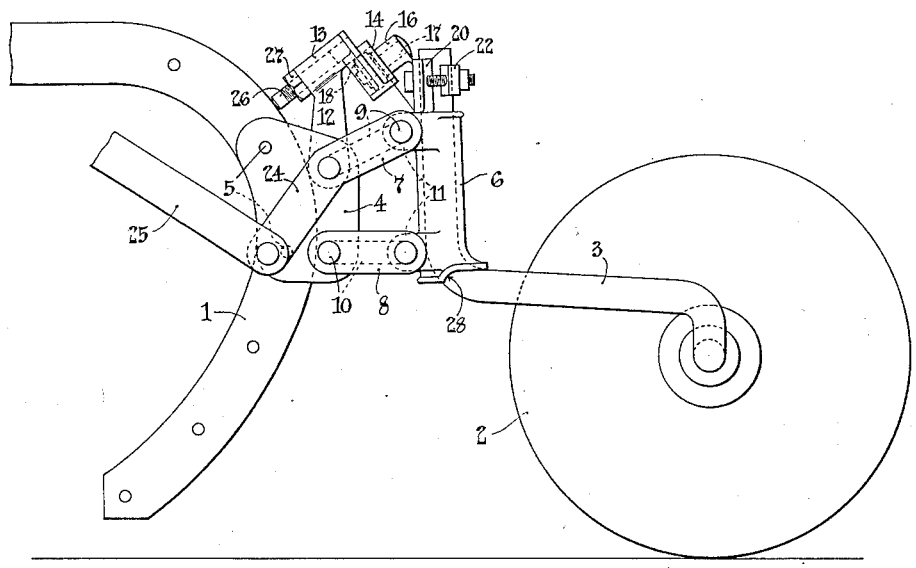
Figure 2:
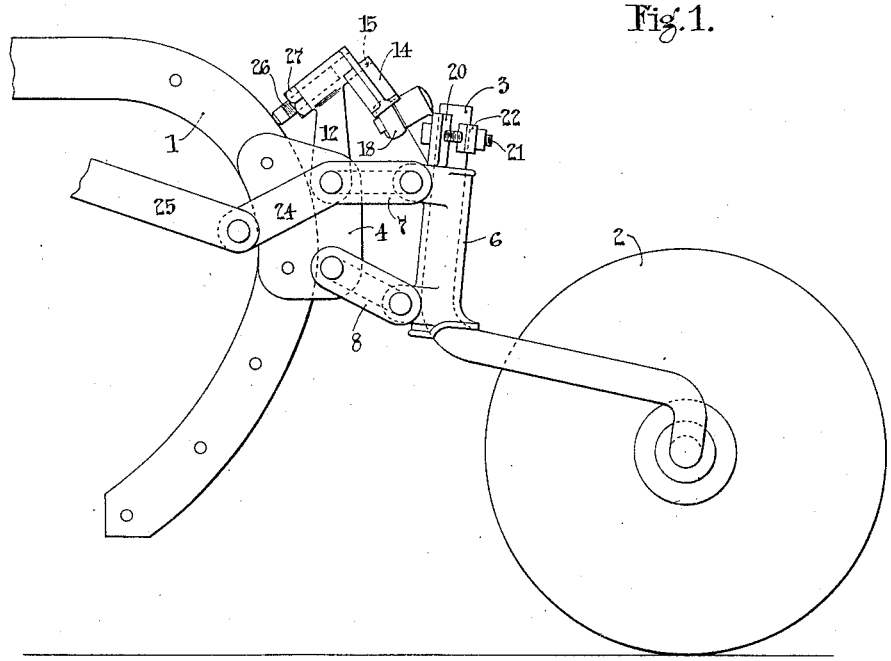

Figure 1 is a side elevation of the invention with the rear wheel in plowing position, Figure 2 is a side elevation showing the invention as it appears when the plow is lifted, Figure 3 is a side elevation of part of Figure 1, on a larger scale and partially in section on line 3—3 of Figure 4, Figure 4 is a section on line 4—4 of Figure 3, Figure 5 is a plan view of a part of Figure 3, Figure 6 is a side elevation illustrating a modified form of the invention, and Figure 7 is a plan view of a portion of Figure 6.

In Figures 1 and 2 the rear end of a plow beam is indicated at 1, a rear wheel at 2 and the rear wheel axle at 3, all of which parts may be of any ordinary construction. To each side of the beam 1 a plate 4 is attached by any suitable means such as bolts or rivets 5. The plates 4 project rearwardly of the beam 1 and form a bracket having two pairs of aligned holes. A bearing member 6 is rotatably mounted on the forward end of the axle 3. The bearing member 6 is connected to the bracket 4 by any suitable links, as indicated at 7 and 8. The pivots for the links may conveniently be formed by the parallel portions of U-shaped link members 9 and 10 which are mounted at one end in lugs 11 on the bearing 3, and at the other end in the aligned holes in the bracket plates 4.

Mounted on the link member 9 between the plates 4, and held frictionally against movement by the latter, is a lug 12 provided at its upper end with a head 13. The head 13 is furnished with a pair of rearwardly and downwardly diverging guide arms 14, preferably formed with a substantially semi-cylindrical depression 15 on their under faces, see Figure 4.

To the upper end of the axle 3, above the bearing member 6, is rigidly attached a bracket 16 which carries a pivot pin 17 on which is journalled a roller 18 preferably of the same diameter as the depression 15. The bracket 16 is attached to the axle 6 in an adjustable manner. For example, the bracket may be connected integrally by a web 19 to a block 20 shaped to engage the axle. Bolts 21 connect the block 20 to a similarly shaped block 22 on the other side of the axle. A set screw 23 may be provided for positively holding the roller-carrying means against rotation on the axle 3.

A forward extension 24 of the link 7 is pivotally connected to a bar 25 which is connected to the usual plow lifting means, not shown. The head 13 is bored and threaded to receive a screw 26 held in adjusted position by a lock nut 27. The screw 26 bears against the beam 1.

The plowing position of the invention is illustrated in Figures 1, 3, 4 and 6. With the plow in this position, the roller 18 is in engagement with the depression 15 between the guide arms 14 so that the rear wheel 2 is held securely in operative position. Should an obstacle raise the plow and deflect the wheel 2 laterally, one or other of the guide arms 14 will return the roller to the depression 15 immediately the obstacle is passed. Thus, the rear wheel may be deflected momentarily and automatically returned, without deflecting the remaining part of the plow.

When the plow is lifted for transportation or turning at the end of a furrow by the usual mechanism, a forward pull is exerted on the bar 25 and the links 7 and 8 are rocked to the position shown in Figure 2, thus raising the beam 1 and disengaging the roller 18 from the guide arms 14. The rear axle 3 is now free to turn within the bearing 6, its turning movement being limited, for example, by shoulders 28 on the lower end of bearing 6. The shoulders 28 are so disposed as to prevent the axle 3 from turning sufficiently far to carry the roller 18 beyond the free ends of the guide arms 14. If the wheel is still deflected at the moment when the plow is again depressed, one of the guide arms 14 will engage the roller 16 as indicated in Figure 4. The weight of the plow will cause the roller to roll along the arm 14 and into the groove 15, thus causing automatic and instantaneous return of the axle and wheel 2 to the desired operative position.

By slackening the set screw 23 and the nut on one of the bolts, and by tightening the nut on the other bolt 22, the normal operative position of the wheel 2 can be adjusted angularly in relation to the plow whereby the gather of the plow is varied to suit requirements.

The suction or amount of dip of the plow may be varied by screwing the screw 26 into or out of the head 13, whereby the angular position of the guide arms 14 in relation to the plow beam is varied to the desired extent.

The arrangement shown in Figures 6 and 7 differs from that described above merely in that the guide arms 14 are connected to the rear axle 3 and the roller 18 is carried by the head 13. The roller 18 is mounted on the pin 17 which, in this case, is mounted in lugs 16a integral with the head 13. The arms 14 diverge upwardly and forwardly and are connected by a web 19a to the block 20. The operation of this form of the invention is the same as that hereinbefore described.

Many other modifications may be resorted to within the scope of the appended claims without departing from the invention.

It will be noticed that as the lug 12 of the guide member 14 is pivoted to the bracket 4 on the same axis as the link 7, the relationship between the guide member 14 and roller 18 is not substantially disturbed by any adjustment of the screw 26. Also any upward thrusts on the wheel 2 are transmitted through the axle 3, roller 18, guide member 14 and screw 26 to the beam 1, so that a very strong construction is provided.

Where it is stated in the claims that certain members are connected to or supported by the plow beam, the word "beam" is intended to include any member carried by the beam such as the brackets 4.

The term "positioning member" includes any suitable stop member capable of coacting with the V-shaped guide member to effect automatic centering of the rear wheel, such positioning member being constructed either with or without an antifriction roller.

I claim:

1. A rear wheel construction for plows comprising a plow beam, a bracket on said beam, a tubular supporting member, links connecting said supporting member with said bracket, a rear axle rotatably mounted in said member, a trailing rear wheel on said axle, a lug pivotally mounted on said bracket and frictionally held thereby, a clamping device on said axle above said supporting member, and a roller and guide member carried one by said lug and the other by said clamping device, one of said links being extended forwardly to form a lever whereby the plow may be lifted to separate said roller from said guide member.

2. A rear wheel construction as claimed in claim 1, wherein an adjustable set screw is mounted in said lug and bears against the plow beam.

3. A rear wheel construction for plows comprising a plow beam, a rear wheel, a rear axle for said wheel, a supporting member in which said axle is rotatably mounted, lifting means pivotally connecting said supporting member with said plow beam, a roller, a guide member consisting of diverging arms and coacting with said roller, and means for rigidly connecting said roller and guide member one with the plow beam and the other with the rear axle, said connecting means comprising a lug connected with the plow beam and a clamping device connected with the rear axle, means being provided for adjusting said lug about a transverse axis to vary the suction of the plow.

4. A rear wheel construction for plows comprising a plow beam, a rear wheel, a rear axle for said wheel, a supporting member in which said axle is rotatably mounted, lifting means pivotally connecting said supporting member with said plow beam, a roller, a guide member consisting of diverging arms and coacting with said roller, and means for rigidly connecting said roller and guide member one with the plow beam and the other with the rear axle, said connecting means comprising a lug connected with the plow beam and a clamping device connected with the rear axle, said clamping device being adjustable about the axis of the rear axle to vary the gather of the plow.

5. A rear wheel construction for plows comprising a plow beam, a rear wheel, an axle for said wheel bent upwardly at its forward end, a tubular supporting member in which the forward end of said axle is mounted, a plurality of forwardly converging links pivotally connected at one end to said supporting member and at the other end to the plow beam, a forward extension on one of said links, operating means connected with said extension, a positioning member and a guide member connected one with said plow beam and the other with said axle above the supporting member, said positioning and guide members cooperating to return the rear wheel to operative position immediately the plow is lowered.

6. A rear wheel construction for plows, comprising a plow beam, a rear wheel, an axle for said wheel bent upwardly at its forward end, a tubular supporting member in which the forward end of said axle is mounted for limited rotary movement therein, a bracket on the plow beam, a pair of forwardly converging links pivotally connected at one end to said supporting member and at the other end to said bracket, a forward extension on one of said links, operating means connected with said extension to cause swinging of said links, a guide member having downwardly diverging arms, and a positioning member between said arms, said guide member and positioning member being carried one by said bracket and the other by said axle above said supporting member and cooperating to return the rear wheel automatically to operative position immediately the plow is lowered.

7. A rear wheel construction as claimed in claim 5, wherein said guide member is pivotally connected with the plow beam on the same axis as the uppermost of said links.

In testimony whereof I have affixed my signature.

WM. J. VERITY.